United States Patent
Gu et al.

(10) Patent No.: US 7,584,374 B2
(45) Date of Patent: Sep. 1, 2009

(54) DRIVER/VARIABLE CACHE AND BATCH READING SYSTEM AND METHOD FOR FAST RESUME

(75) Inventors: Xiaogang Gu, Shanghai (CN); Vincent J. Zimmer, Federal Way, WA (US); Michael A. Rothman, Puyallup, WA (US); Yuanyuan Xing, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 348 days.

(21) Appl. No.: 11/370,415

(22) Filed: Mar. 7, 2006

(65) Prior Publication Data

US 2007/0214349 A1    Sep. 13, 2007

(51) Int. Cl.
*G06F 1/00* (2006.01)
*G06F 9/00* (2006.01)
*G06F 15/177* (2006.01)
*G06F 9/44* (2006.01)

(52) U.S. Cl. .............. 713/323; 713/1; 713/12; 713/100; 713/300; 719/327

(58) Field of Classification Search ......... 713/323, 713/300, 1, 2, 100; 719/327
See application file for complete search history.

(56) References Cited

U.S. PATENT DOCUMENTS

| | | | | |
|---|---|---|---|---|
| 6,832,311 | B2* | 12/2004 | Morisawa | 713/1 |
| 7,143,276 | B2* | 11/2006 | Garrett et al. | 713/2 |
| 7,240,190 | B2* | 7/2007 | Lai | 713/2 |
| 7,278,016 | B1* | 10/2007 | Detrick et al. | 713/2 |
| 7,318,149 | B2* | 1/2008 | Cepulis et al. | 713/2 |
| 7,328,333 | B2* | 2/2008 | Kawano et al. | 713/1 |

OTHER PUBLICATIONS

Xiaogang Gu et al., U.S. Appl. No. 11/322,858, entitled "Processor State Restoration and Method for Resume," filed Dec. 30, 2005.

* cited by examiner

*Primary Examiner*—Thomas Lee
*Assistant Examiner*—Stefan Stoynov
(74) *Attorney, Agent, or Firm*—Joni D. Stutman

(57) ABSTRACT

In some embodiments, the invention involves a system and method for fast resume from sleep mode. Reserved cache memory is used to store drivers and configuration variables. Upon resume, the drivers and configuration are read from the ACPI reserved cache memory and executed in memory rather than read from slower flash or CMOS memory. Other embodiments are described and claimed.

14 Claims, 7 Drawing Sheets

DRIVER/VARIABLE CACHE AND BATCH READING SYSTEM AND METHOD FOR FAST RESUME

CROSS-REFERENCE TO RELATED APPLICATION

The present application is related to co-pending U.S. patent application Ser. No. 11/322,858, entitled "PROCESSOR STATE RESTORATION AND METHOD FOR RESUME," to Xiaogang Gu, Vincent J. Zimmer, Michael A. Rothman, and Yuanyuan Xing and assigned to the assignee of the present invention, filed on Dec. 30, 2005.

FIELD OF THE INVENTION

An embodiment of the present invention relates generally to computing devices and, more specifically, to fast resume from sleep mode using reserved cache memory to store drivers and configuration variables.

BACKGROUND INFORMATION

Various mechanisms exist for placing a platform into a lower operational state or sleep mode. Resuming from the sleep mode can be time consuming. The industry is converging on resume speed as a metric that is monitored for licensing or beneficial pricing with regards to preloaded images of Microsoft® Windows®. Recent industry movement is to require a platform to resume to normal operation in less than ¼ second.

A platform often needs to receive direction from the system regarding setup related or platform configuration settings to determine how to operate, including how to resume from a sleep or lower operational state. These configurations are often stored in non-volatile (NV) storage such as CMOS or a flash memory device. Retrieval from these NV storage devices takes a significant amount of time as the access times are slower than system memory.

BRIEF DESCRIPTION OF THE DRAWINGS

The features and advantages of the present invention will become apparent from the following detailed description of the present invention in which.

DETAILED DESCRIPTION

An embodiment of the present invention is a system and method relating to fast resume from sleep or S3 mode. In at least one embodiment, the present invention is intended to use reserved cache memory to store drivers and configuration variables which are required upon a resume to normal operations.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

Gathering configuration settings from non-volatile storage can be time consuming. Certain required configuration settings are necessary settings that are required to operate the platform, but do not reside in the system firmware. The firmware may have derived these settings from user input. In other cases, the firmware may derive these settings by probing the operational system. A platform state that is not bound to the processor, for instance chipset or other configuration settings must be restored during a resume from a sleep state, prior to passing control back to the operating system (OS).

Figure 1:
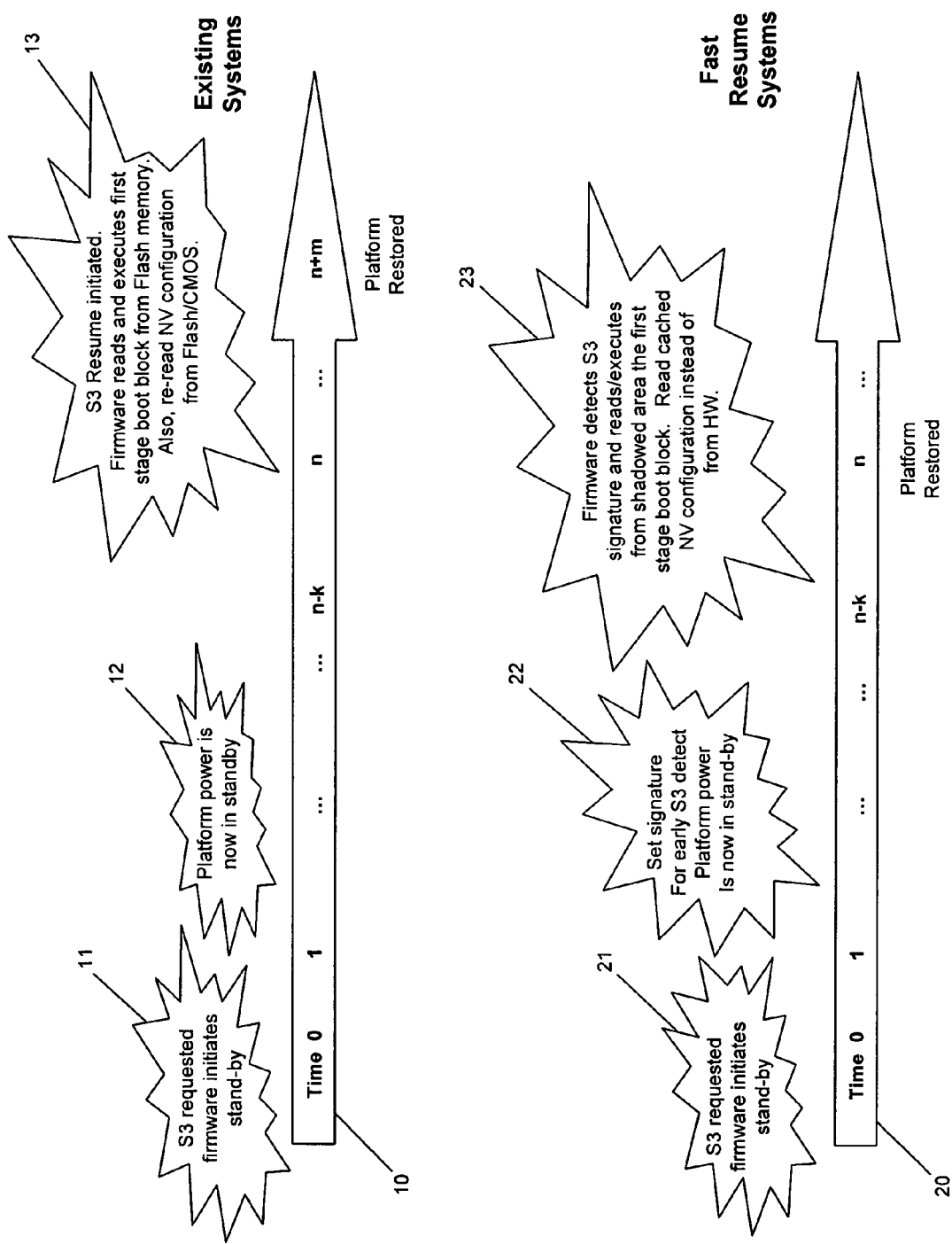
FIG. 1 shows a comparison of timelines for resuming using existing methods and an embodiment of the present invention.

FIG. 1 shows two timelines. Timeline 10 a system resuming from a sleep state in an existing system. Timeline 20 is a system resuming from a sleep state according to an embodiment of the invention as described herein. In existing systems, a sleep mode is initiated in a platform at 11. For purposes of discussion, the S3 sleep state is used to illustrate embodiments of the invention. The S3 power state is defined in the industry standard specification for Advanced Configuration and Power Interface (ACPI) which may be found on the public Internet at www-acpi-com. It should be noted that periods have been replaced with dashes in URLs within this document to avoid inadvertent hyperlinks. The platform power is put into standby, or the S3 state, at 12. An event occurs to initiate a resume from standby (S3) at 13. This event may be caused by a user moving a mouse or other input device. The firmware re-reads and executes a first stage boot block from flash memory. The firmware also re-reads the NV configuration from flash, CMOS or other NV device. The platform is then restored to a normal operational state at time n+m.

In an embodiment of the invention, S3 mode is requested and the firmware initiates standby mode at 21. A signature may then be set for an early S3 detection at 22. The platform is then placed in S3 standby mode. When an event indicates that the platform is to be resumed at 23, the firmware detects the S3 signature. Instead of reading from the first stage boot block or re-reading the configuration from flash memory, the firmware jumps directly to a shadowed area of the first stage boot block. The shadowed area may be a protected area in system memory that mirrors the boot block in the firmware flash memory. Instead of executing from flash memory, the first stage boot block may be executed from system memory (RAM) which is much faster. The NV configuration data may also be cached in system memory to enable faster access. The platform is now restored to operational mode at time n. It will be apparent to one of skill in the art that avoiding having the firmware read and execute the first stage boot block from flash memory saves at least a delta time m. Thus, the platform resumes from S3 faster than in existing systems.

Figure 2:
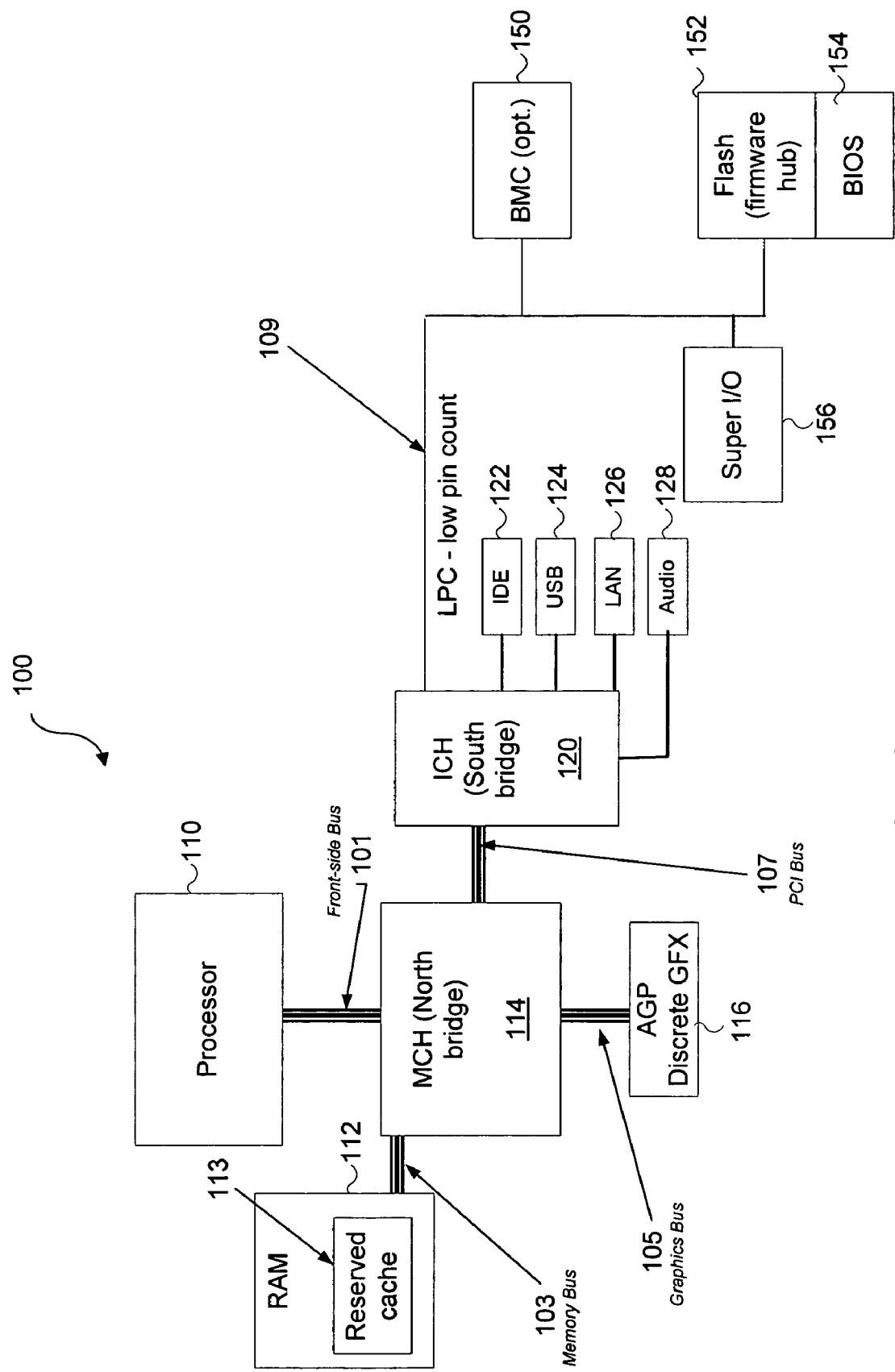
FIG. 2 is block diagram of an exemplary computing system environment in which embodiments of the invention may be implemented.

FIG. 2 is a block diagram of an exemplary system 100 in which embodiments of the invention may be implemented. Processor 110 communicates with a memory controller hub (MCH) 114, also known as North bridge, via the front side bus 101. The MCH 114 communicates with system memory 112 via a memory bus 103. The reserved cache memory 113 may reside in the system RAM or comprise other fast RAM communicatively coupled to the processor 110. The MCH 114 may also communicate with an advanced graphics port (AGP) 116 via a graphics bus 105. The MCH 114 communicates with an I/O controller hub (ICH) 120, also known as South bridge, via a peripheral component interconnect (PCI) bus 107. The ICH 120 may be coupled to one or more components such as PCI hard drives (not shown), legacy components such as IDE 122, USB 124, LAN 126 and Audio 128, and a Super I/O (SIO) controller 156 via a low pin count (LPC) bus 156.

Processor 110 may be any type of processor capable of executing software, such as a microprocessor, digital signal processor, microcontroller, or the like. Though FIG. 2 shows only one such processor 110, there may be one or more processors in platform hardware 100 and one or more of the processors may include multiple threads, multiple cores, or the like.

Memory 112 may be a hard disk, a floppy disk, random access memory (RAM), read only memory (ROM), flash memory, or any other type of medium readable by processor 110. Memory 112 may store instructions for performing the execution of method embodiments of the present invention.

Non-volatile memory, such as flash memory 152, may be coupled to the 10 controller via a low pin count (LPC) bus 109. The BIOS firmware 154 typically resides in the flash memory 152 and boot up will execute instructions from the flash, or firmware.

In some embodiments, platform 100 may be used with platform management systems. This platform embodiment may have a baseboard management controller (BMC) 150 coupled to the ICH 120 via the LPC 109 or another type of out-of-band communication device such as the Intel® Active Management Technology (IAMT) (not shown). More information about IAMT may be found on the public Internet at URL www-intel-com/technology/manage/iamt/.

Figure 3A:
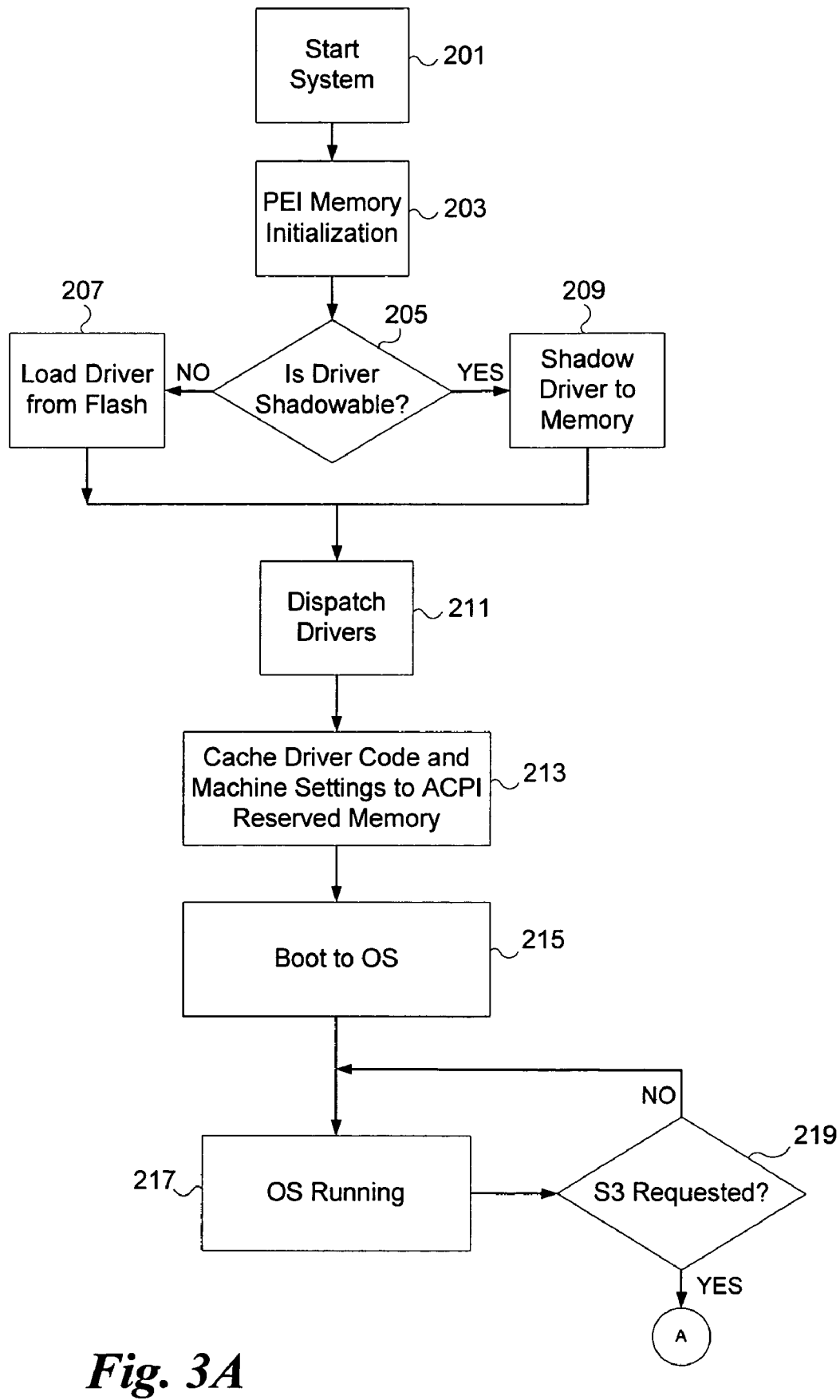
FIGS. 3A-B are flow diagrams illustrating a method for fast resume, according to an embodiment of the invention.
Figure 3B:
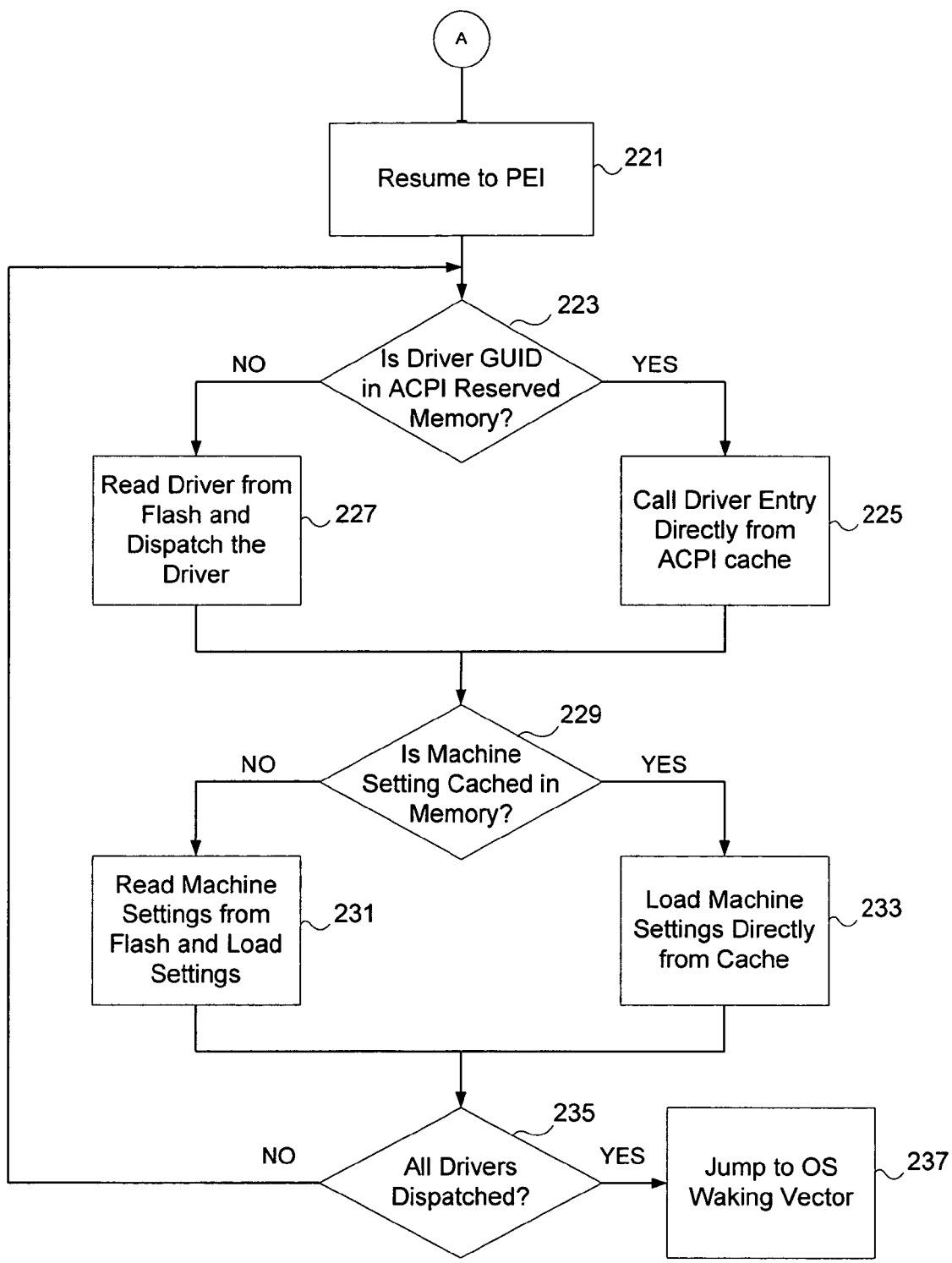

FIGS. 3A-B comprise a flow diagram illustrating a fast resume method according to an embodiment of the invention. The system is started in block 201. In a system with an extensible firmware interface (EFI), the pre-EFI Initialization (PEI) initializes the memory in block 203. Many newer systems may be configured with an EFI architecture. The pre-EFI Initialization (PEI) flow of an Intel® Platform Innovation Framework for the Extensible Firmware Interface, for instance, may be found on the public Internet at URL www-intel-com/technology/framework. The PEI flow is responsible for restoring the machine from an S3 low power state. When memory is initialized, the firmware instructions may be shadowed into the initialized memory into protected/reserved memory. This allows a faster resume from memory than from slower flash memory.

A determination is made in block 205 as to whether the driver is shadowable. Most drivers are expected to be shadowable, but some may be configured to disallow shadowing. In some cases, there might be a component that is defined by platform policy not to be shadowed, for instance, for security or other reasons. The drivers reside in flash memory and run from the flash memory in existing systems. A shadowable driver may be moved to memory instead of residing only on the flash in block 209. A copy of the firmware driver is made and put into memory. Thus, upon a resume from sleep mode (S3) the driver may be run or dispatched from faster memory rather than retrieving and running from slower flash memory. The driver may be dispatched from faster memory at power on, in addition to resume time. In either case, the drivers are then dispatched in block 211.

The default settings are batch read to ACPI reserved memory. The default settings may be read serially. In other words, the dispatched drivers and their configuration information are put into ACPI reserved memory in block 213. Other machine settings, for instance, for the chipset, may be cached as well. Generally, operations that are pertinent to the operation of the platform, such as port definitions may be cached here. In some embodiments, if a platform has a policy that a specific driver is not to be shadowed, then this driver's default settings may not be cached, or shadowed. The operating system (OS) is then booted in block 215. The OS continues normal operation in block 217 until sleep mode, S3, or the like is requested. If sleep mode is requested, as determined in block 219, then PEI operations take control in block 221. In embodiments of the invention, modules that would normally be run from flash memory instead now reside in cache. Resuming to PEI may comprise dispatching the modules from cache. The driver may be identified by a globally unique identifier (GUID), or signature. The PEI process determines which drivers are in cache based on their respective GUIDs in block 223. If the driver GUID is found in ACPI reserved memory, then the driver is dispatched from ACPI memory in block 225. If the driver GUID is not located in ACPI cache, then the PEI retrieves the driver from flash, or other non-volatile, memory in block 227.

A determination is then made as to whether machine settings reside in cache memory in block 229. If so, then the machine settings are read directly from the cache memory and loaded in block 231. If not, then the machine settings are read from flash and loaded in block 233.

A determination is then made as to whether all of the drivers have been dispatched in block 235. If not, then processing continues at block 223. Once all of the drivers have been dispatched, then PEI jumps to the waking vector to resume the OS operation.

In other embodiments, this method may be combined with other methods for fast resume to benefit from cumulative time savings. For instance, in an embodiment, the system and method as described herein may be combined with a system and method to save the processor state(s) in a buffer that allows fast access upon a resume from sleep mode. One such method is described in a co-pending U.S. patent application Ser. No. 11/322,858, entitled "PROCESSOR STATE RESTORATION AND METHOD FOR RESUME," to Xiaogang (Alex) Gu, Vincent J. Zimmer, Michael A. Rothman, and Yuanyuan (Sean) Xing and assigned to the assignee of the present invention, filed on Dec. 30, 2005.

An embodiment of the present invention may save the processor state(s) in a buffer that allows fast access upon a resume from sleep mode. Thus, the processor state is saved in a fast buffer, as well as driver and configuration information. When a sleep (S3 mode) is initiated in a platform, processor state context is saved in a system reserved buffer, or cache, that does not allow access to the operating system. In an EFI architecture platform, the firmware (EFI) has access to the buffer and upon a resume, the processor context(s) are restored from a fast buffer. Prior art systems typically save context in non-volatile slower memory, like the firmware flash memory or CMOS. In this embodiment, the processor context, drivers and configuration information may all be saved and restored from faster cached memory rather than from slower flash/CMOS or other NV memory.

Figure 4:
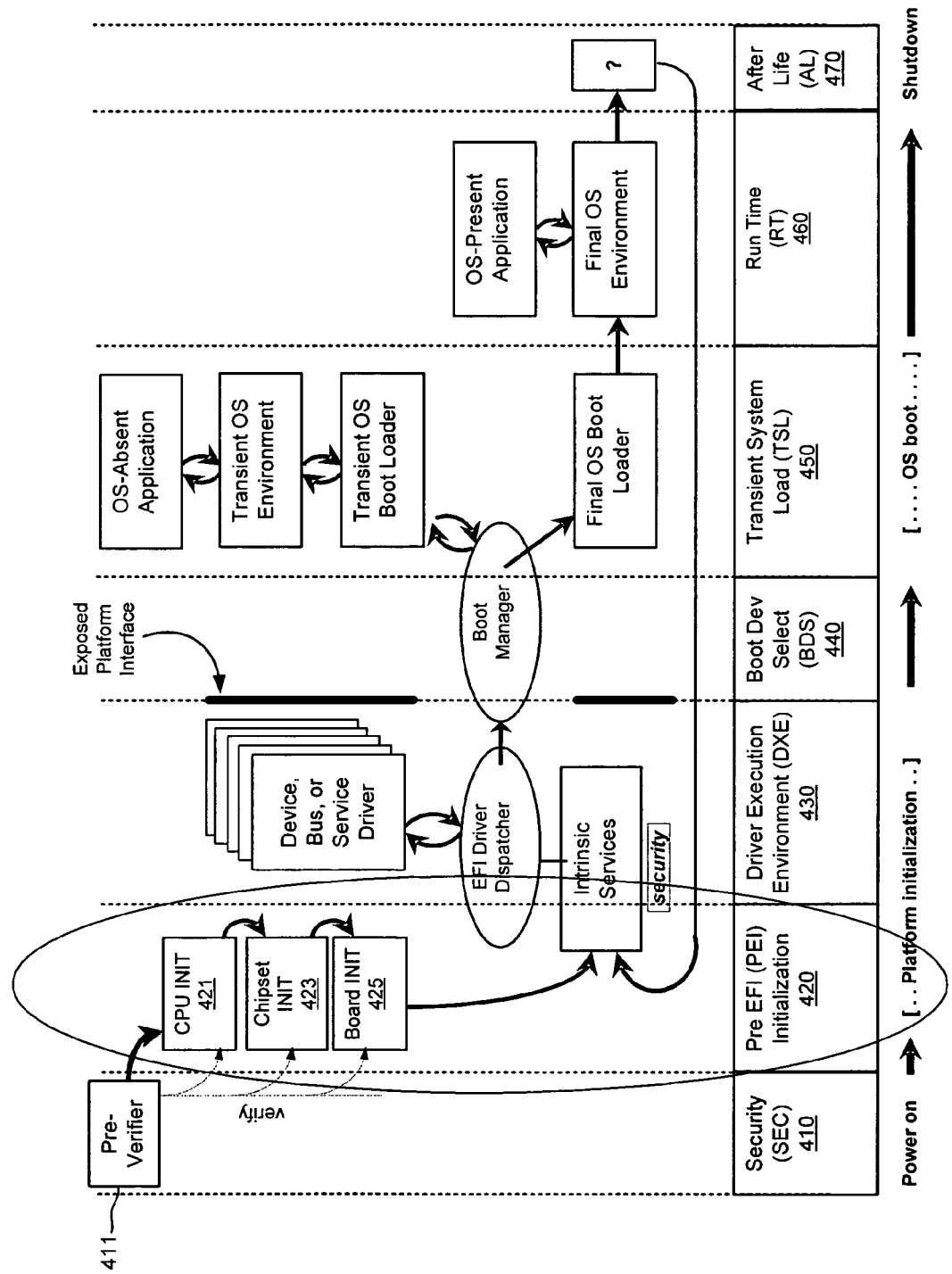
FIG. 4 illustrates the flow of execution of a system, according to an embodiment of the invention.

FIG. 4 illustrates the flow of execution of a system according to an embodiment of the invention. A pre-verifier 411 may be run at power-on and the security (SEC) phase 410. A pre-verifier is typically an authenticated code module (AC) module that initializes and checks the environment. In existing systems, the pre-verifier and SEC phase is the Core Root of Trust for Measurement (CRTM), namely enough code to startup a Trusted Platform Module (TPM) and perform a hash-extend of BIOS. More information on TPMs may be found at URL www-trustedcomputinggroup-org.

The processor 421, chipset 423 and board 425 may be initialized in the pre-EFI initialization (PEI) stage 420. After PEI, the EFI Driver Dispatcher and Intrinsic Services are launched securely in the driver execution environment (DXE) 430. In some embodiments, the operations at the PEI phase 420 may be run from cache as RAM (CRAM) before EXITAC to DXE 430. The OS boots at the transient system load (TDL) stage 450.

The boot device select (BDS) phase 440 is responsible for choosing the appropriate operating system. Upon a system failure during OS runtime (RT phase 460), such as what is referred to as BSOD (Blue Screen Of Death) in Windows® or Panic in Unix/Linux, the firmware PEI and DXE flows may be reconstituted in an after life (AL phase 470) in order to allow OS-absent recovery activities.

Figure 5:
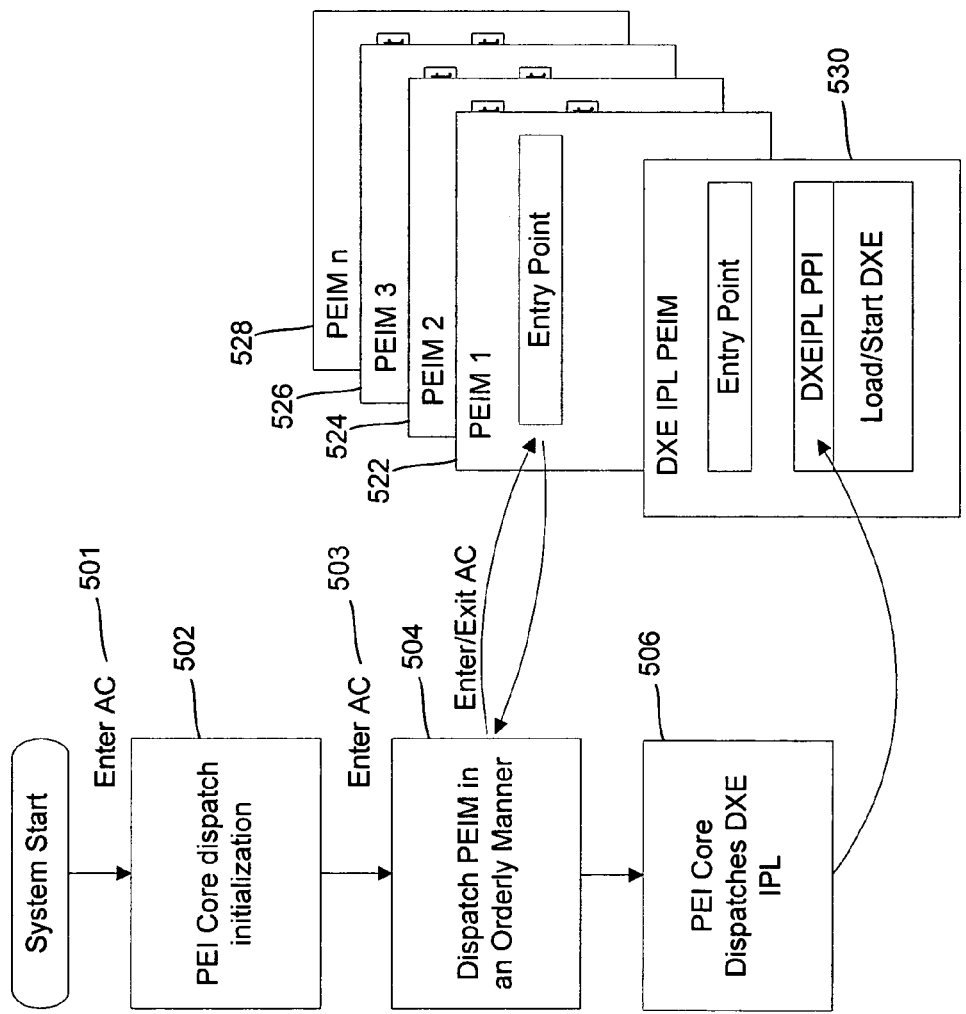
FIG. 5 is a flow diagram illustrating a method for pre-EFI initialization (PEI), according to an embodiment of the invention.

Embodiments may be implemented on a platform 100 with EFI architecture using the PEI as described above. FIG. 5 is a flow diagram illustrating a method for pre-EFI initialization (PEI) 420, according to an embodiment of the invention. In an embodiment, PEI core modules may be entered using the secure machine instructions (SMX). In this embodiment, SENTER and ENTERAC instructions may be added to the Instruction Set of the processor to enable the secure machine extensions. ENTERAC loads, authenticates and invokes the an authenticated code (AC) module at the pre-EFI core (PEI core) into cache. In an embodiment, the cache is implemented as RAM and is referred to as cache as RAM (CRAM). In an embodiment, EXITAC is typically the last instruction in AC module execution. The EXITAC shuts down the CRAM or invokes the next phase of execution. However, in some embodiments, if the microcode detects tampering, the AC module is not invoked, but an error message is sent to notify the system (or operator) that an error has occurred, and the initialization may be aborted.

When the system is started, an ENTERAC 501, or similar, command is executed. The processor microcode loads the SEC module into CRAM 502 at the pre-verify stage (FIG. 4, 411). The processor microcode is trusted, as it was delivered with the processor, and may contain a private key. The microcode loads the first firmware module (Pre-verification module) 522 into CRAM and may verify that it is a trusted module using the keys. The pre-verify module executes the ENTERAC instruction 503 and subsequently loads all of the PEI modules 1 to n (522, 524, 526, 528) at 504. Each module may be loaded after another ENTERAC instruction. After memory has been initialized, the modules may be loaded into RAM rather than CRAM. Modules are exited using EXITAC, or similar, instruction. After the PEI modules are loaded and run, the DXE mode may be dispatched 506. The drivers may then be loaded in the DXE phase 530. Once the drivers are loaded the OS may be launched.

In one embodiment, a single module loads all of the subsequent modules. In another embodiment, successive modules load the next successive module. The ENTERAC instruction is executed prior to loading a PEI module. When each module completes, an EXITAC instruction is executed. In the illustration, a dispatcher module is loaded first, which then loads each successive PEI module. In this embodiment, the first module may be started with a SENTER instruction and all the subsequent modules may be loaded and run using an ENTERAC and an EXITAC instruction.

The DXE phase may be executed in regular memory. The DXE phase automatically launches the boot manager for booting the OS.

When a system boots up or resumes from standby/sleep mode, it typically reads information, for instance, processor state, from a non-volatile (NV) memory device, like flash memory. These NV devices tend to be very slow. Thus, if too much information must be read from one of these slow devices, the critical boot/resume intervals times may not be met.

In embodiments of the invention, the operating system (OS) initiates a standby state, typically causing a system management interrupt (SMI). The firmware effectively controls the system management mode (SMM). The firmware will save the appropriate data and then put the system into standby. The time it takes to enter standby mode is not relevant to the industry requirements. The important metric is how long it takes to resume from standby.

Existing systems may store standby related data in the flash and the firmware will execute necessary standby code from flash memory. This is very slow. Embodiments of the invention cache the necessary standby data into a memory buffer which is very fast. When the system resumes, it will now retrieve the information from the memory buffer instead of the slower flash. In an embodiment, the memory cache is located in protected (reserved) memory to which the operating system (OS) has no access. In an embodiment, the memory cache buffer is located in the reserved memory. NVS literally means non-volatile store. However, NVS buffers are typically volatile memory, i.e., if you lose power, that NVS section loses its data. NVS is an ACPI standard term for a region which is intended not to be touched by the OS—thus "non-volatile." The NVS memory is reserved for the firmware and is inaccessible by the OS. The location of the buffer may be defined by ACPI. This memory buffer is typically protected by convention rather than by hardware mechanisms. Typically, the NVS memory is a reserved portion of volatile system random access memory (RAM). When a platform is plugged into an AC power outlet or operating from a DC battery, there will be a small charge to the volatile memory. Thus, when the platform is in sleep mode, the NVS buffer remains intact. If the AC power fails or battery runs down the store may lose its contents. However, in these cases, the platform will typically perform a full shutdown or go into hibernate mode. Since resuming from a full shutdown initializes all memory, processor context is not relevant. When a platform hibernates, all machine, processor and application context is saved to a hard drive. Thus, the NVS buffer is no longer relevant. In those cases where the system is able to resume from the sleep mode, the volatile store will have maintained the processor context and restoring from a reserved area of system memory is much faster than resuming from a non-volatile store.

Figure 6:
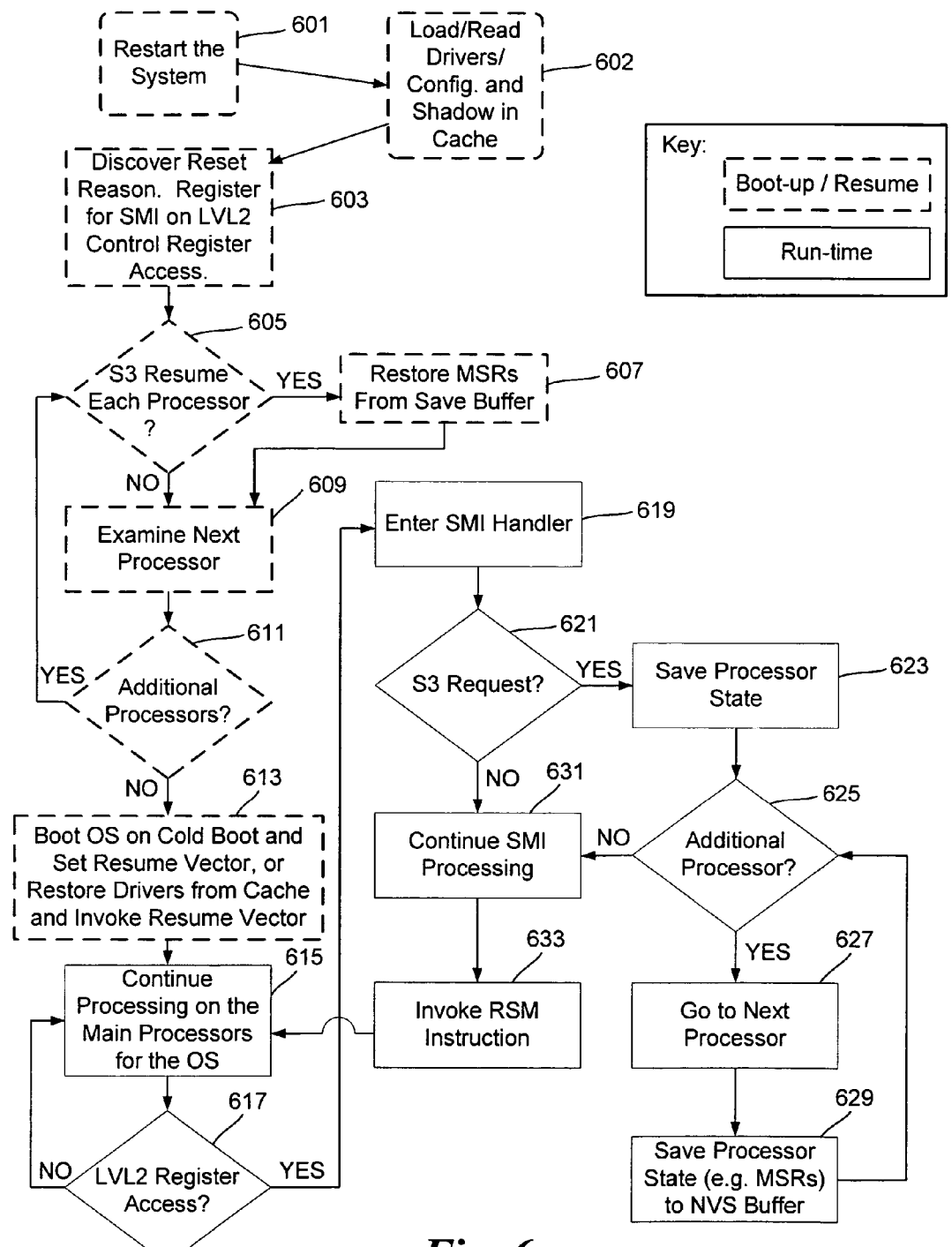
FIG. 6 is a flow diagram illustrating a method for efficiently resuming a machine from an S3 state using processor state(s) and drivers/configuration data saved in a buffer, according to an embodiment of the invention.

FIG. 6 is a flow diagram illustrating a method for efficiently resuming a machine from an S3 state using processor state(s) saved in a buffer, according to an embodiment of the invention. A system 100 has at least one processor 110. When the system is restarted/booted in block 601, the drivers are shadowed according to a method such as described in FIGS. 3A-B, in block 602. The reason the system has restarted may be discovered in block 603. If the reset is an actual restart or boot of the system, then normal boot operations occur after shadowing the drivers, as discussed above. During system boot, the firmware registers the appropriate system management interrupt (SMI) processing to handle the machine state caching in the system management mode (SMM).

A determination is made in block 605 as to whether the restart for each processor is due to a Resume. If so, then the processor state information must be retrieved. The machine state registers (MSRs) are retrieved from the NVS buffer in block 607. The next processor, if any, in the system is then examined in block 609. Typically, when one processor is in a sleep mode, all processors in the system are in S3. In some embodiments, it may be possible for some processors to be in a sleep mode and other processors to be in normal mode. While S3 mode is described as being the exemplary sleep mode to be resumed from in this disclosure, embodiments of the invention may be implemented for other sleep modes. It will be apparent to one of skill in the art that the flow in FIG. 6 may be altered to accommodate varying embodiments. Steps may be performed in other orders or omitted as necessary without violating the teachings of this disclosure. If there are additional processors, as determined in block 611, then the next processor is checked to determine whether it is to resume from an S3, in block 609, and the cycle continues.

If there are no additional processors, as determined in block 611, the OS is booted on a cold boot and the resume vector is set in block 613. If it is determined that the platform is resuming from sleep mode, then the drivers are loaded according to a method as discussed in FIG. 2, and the resume vector is invoked. The platform then resumes.

Once the system is running normally, at block 615, a determination is made as to whether LVL2 register access is performed, or whether there has been a power management event, in block 617. In ACPI terminology a LVL2 register may be accessed to indicate that the processor is to be put into S3 mode. The firmware defines which register accesses will cause an SMI. Other implementations may use an alternate register or method. If no register access is performed, normal processing continues at block 615. Otherwise, a system management interrupt (SMI) handler is entered in block 619. If the SMI handler determines that there has been an S3 request to sleep, in block 621, then the machine state registers (MSRs) must be saved in block 623. For each processor in the platform, its state (MSR) is saved in NVS reserved memory (cache) in the loop of blocks 623, 625, 627, and 629. When there are no more processors for which to save the MSR, as determined in block 625, or the SMI was not a request for S3, SMI processing continues in block 631. Once completed the SMI initiates an RSM return from system management mode instruction in block 633. Normal processing continues at 615 again.

In existing systems, resuming from S3 is implemented differently depending on the vendor and tends to be mode ad hoc. The state of the processors is saved in CMOS or other non-volatile store. There is no standard solution. Previous methods were not able to reserve memory. Thus, embodiments of the present invention are capable of accessing the saved MSRs much quicker than in existing systems and perform in a standardized way.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device.

Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system comprising:
   at least one processor on a platform;
   a chipset coupled to the at least one processor, the chipset to identify when the at least one processor is to be put into a low power state or raised from a low power state to a normal operational state;
   a volatile memory store coupled to the at least one processor to store drivers and configuration data associated with the at least one processor in a portion of the volatile memory, wherein the portion of volatile memory is reserved for firmware use and inaccessible to an operating system on the platform;
   means for shadowing a first stage boot block to the volatile memory at boot time;
   means for shadowing a plurality of drivers and configuration data to the volatile memory store at boot time;
   means for executing the first stage boot block directly from the volatile memory, in response to a request to restore the platform to a normal operational state from a low-power state; and
   means for accessing a plurality of drivers and configuration data in the volatile memory store by the first stage boot block, in response to the request to restore the platform to a normal operational state from a low-power state.

2. The system as recited in claim 1, wherein means for shadowing a plurality of drivers comprises:
   a globally unique identifier (GUID) associated with each the plurality of drivers; and
   a power management configuration interface architecture for reserving portions of volatile memory for firmware use, wherein a portion of reserved volatile memory is to be encoded with the GUID of an associated driver at boot time, when the associated driver is shadowed in the reserved volatile memory.

3. The system as recited in claim 2, wherein, at boot time, the means for shadowing is to determine whether each of the plurality of drivers is shadowable, and if so then copying each shadowable driver and corresponding variables to the reserved volatile memory, wherein the means for shadowing is configured to use platform policy information to determine whether each of the plurality of drivers is permitted to be shadowed, and when a driver is not permitted to be shadowed, then forcing the driver to be executed from firmware memory.

4. The system as recited in claim 1, wherein means for accessing comprises:
   a globally unique identifier (GUID) associated with each the plurality of drivers;
   a power management configuration interface architecture for reserving portions of volatile memory for firmware use, wherein a portion of reserved volatile memory is to be encoded with the GUID of an associated driver at boot time, when the associated driver is shadowed in the reserved volatile memory;
   a component to retrieve the GUID associated with each of the plurality of drivers that has been encoded in the reserved volatile memory store and to retrieve each driver based on the encoded GUID, the component to retrieve and launch each driver in response to a request to restore the platform to a normal operational state from a low-power state.

5. The system as recited in claim 1, further comprising:
   a system management interrupt handler operating on the at least one processor on the platform to save machine context in the volatile memory store, in response to a request to put at least one processor into a low power state, and to restore machine context in response to a request to raise at least one processor from a low power state to a normal operational state.

6. The system as recited in claim 5, wherein the chipset identifies power management requests via access to one of a pre-defined register and input/output port.

7. The system as recited in claim 5, wherein the volatile memory is system random access memory (RAM).

8. The system as recited in claim 5, wherein the firmware is implemented with an extensible firmware interface (EFI) architecture.

9. The system as recited in claim 5, wherein the reserved portion of volatile memory resides at a location defined by a power management configuration interface.

10. The system as recited in claim 1, wherein the reserved portion of volatile memory resides at a location defined by a power management configuration interface.

11. A system comprising:
    at least one processor on a platform;
    a chipset coupled to the at least one processor, the chipset to identify when the at least one processor is to be put into a low power state or raised from a low power state to a normal operational state;
    a volatile memory store coupled to the at least one processor to store drivers and configuration data associated with the at least one processor in a portion of the volatile memory, wherein the portion of volatile memory is reserved for firmware use and inaccessible to an operating system on the platform;
    a plurality of signatures, each signature associated with one of a plurality of shadowable drivers, the plurality of signatures encoded in the portion of the volatile memory store at boot time, wherein the plurality of encoded signatures enable access to the plurality of associated drivers and configuration data in the volatile memory store, in response to a request to restore the platform to a normal operational state from a low-power state; and
    a firmware first stage boot block configured to run directly from the volatile memory store upon a restore action, wherein the firmware first stage boot block in the volatile memory store is a shadow copy of an original first stage boot block stored in non-volatile storage, the original first stage boot block configured to reload drivers upon restoring the platform to a normal operational state from a low-power state, where the drivers are selectively located in one of non-volatile memory or volatile memory.

12. The system as recited in claim 11, wherein each of the plurality of signatures comprise a globally unique identifier (GUID) associated with one of the, plurality of drivers, and wherein a power management configuration interface architecture for reserving portions of volatile memory for firmware use is to define the portion of reserved volatile memory to be encoded with the GUID of an associated driver at boot time, when the associated driver is shadowed in the reserved volatile memory.

13. The system as recited in claim 11, further comprising:
a system management interrupt handler operating on the at least one processor on the platform to save machine context in the volatile memory store, in response to a request to put at least one processor into a low power state, and to restore machine context in response to a request to raise at least one processor from a low power state to a normal operational state.

14. The system as recited in claim 11, wherein the processor resides on a platform having an extensible firmware interface (EFI) architecture.

* * * * *